INVENTORS:
John Woods McCausland
Leslie C. Hardison
BY: Chester J. Giuliani
Philip T. Liggett
ATTORNEYS Dec. 11, 1962  J. W. McCAUSLAND ET AL  3,067,774
DISTRIBUTING VALVE AND FLUID-SOLID CONTACTING
APPARATUS UTILIZING SAME Filed Nov. 20, 1959  4 Sheets—Sheet 3

INVENTORS:
John Woods McCausland
Leslie C. Hardison
BY:
Chester J. Giuliani
Philip T. Liggett
ATTORNEYS Dec. 11, 1962    J. W. McCAUSLAND ET AL    3,067,774
DISTRIBUTING VALVE AND FLUID-SOLID CONTACTING
APPARATUS UTILIZING SAME
Filed Nov. 20, 1959    4 Sheets-Sheet 4

INVENTORS:
John Woods McCausland
Leslie C. Hardison
BY:
Chester J. Giuliani
Philip T. Liggett
ATTORNEYS United States Patent Office 3,067,774
Patented Dec. 11, 1962

3,067,774
DISTRIBUTING VALVE AND FLUID-SOLID CONTACTING APPARATUS UTILIZING SAME
John Woods McCausland, Winnetka, and Leslie C. Hardison, Arlington Heights, Ill., assignors to Universal Oil Products Company, Des Plaines, Ill., a corporation of Delaware
Filed Nov. 20, 1959, Ser. No. 854,355
9 Claims. (Cl. 137—624.13)

This invention relates to a fluid distributing valve for effecting the continuous transfer of a flowing stream into or out of an elongated fixed contact mass or particulated bed whereby the point of fluid injection or withdrawal is continuously or intermittently advanced along and relative to the longitudinal axis of the bed. More particularly, the present invention concerns contacting apparatus utilizing one or more of such valves and capable of accomplishing a variety of fluid-solid contacting operations wherein at least two distinct equilibrium or reaction zones are simultaneously maintained at spaced intervals within a single contact mass.

A great number of commercially important processes employ a contact material which must be periodically or continuously regenerated. Processes involving the conversion of hydrocarbons such as fluid catalytic cracking, fluid coking, catalytic reforming, alkylation, isomerization, polymerization, and hydrocracking are exemplary of these, to name but a few. Another example is the production of hydrogen by the steam-hydrocarbon reaction wherein a contact material serving as a heat-transmitting medium, catalyst, or both, is employed, and by the well-known steamiron reaction. Still another example is the separation of hydrocarbons or other organic compounds by selective sorption with zeolitic materials commonly known as molecular sieves, and the purification of water by contact with a regenerable ion-exchange material. In general, such contacting processes may be mechanically effected by any of four techniques: (1) fluidized bed, (2) compact moving bed, (3) fixed fluidized bed or suspensoid type of operation, and (4) fixed bed. The choice as to which method to employ is determined primarily by the required frequency of regeneration of the contact material, although obviously many other factors must be considered such as feed throughput, heat requirements, and process economics. Each method has its own well-defined advantages and disadvantages. Where the throughput is high and regeneration frequent, a moving fluidized or compact bed type of operation is usually preferred. Frequently, however, a contact material having a superior characteristic of the desired class, whether it be high catalytic activity, or large heat capacity, or good selective sorption ability, possesses such a low attrition resistance as to make it entirely unsuitable for use in the moving bed, since the relatively fragile contactant is soon destroyed by the mechanical strains involved therein. In order to employ such contacting material on a continuous basis, it is necessary to dispose it in a plurality of fixed beds, carrying out the main reaction in one while simultaneously regenerating one or more of the other beds; the feed, product, and regeneration streams are periodically shifted from one bed to the next in regular sequence by suitable fluid distributing means such as a rotary multiport valve or a number of time cycle-controlled gate valves. This "swinging contactor" type of operation is at best semi-continuous, is impractical where the frequency of regeneration is high, and is often inoperable when employed in the separation of isomeric hydrocarbons by means of molecular sieves, since the last-mentioned process usually requires a relatively constant ratio of feed to fresh sorbent.

A recent improvement in a selective sorption process for the separation of isomeric hydrocarbons and using molecular sieves as the sorbent involves arranging the solid sorbent in an elongated bed one end of which communicates with the other to form a closed flow path therethrough, maintaining a continuous fluid flow through the bed, introducing the feed and desorbent streams and withdrawing the product streams at spaced intervals along the length of the bed, and periodically and simultaneously advancing the points of inlet and outlet of said streams in a downstream direction relative to that of the internal circulating flow. In this way a simulated continuous counter-current contact between the fluid and solid is effected, all the advantages of a moving bed technique being realized while the fragile molecular seives are yet maintained as a motionless fixed bed, thereby avoiding such breakage of the sieves and abrasion of process equipment as would normally be encountered in a fluidized or moving bed type of operation. In effect, this procedure establishes a plurality of distinct equilibrium zones, i.e., sorption and desorption, at spaced intervals within the closed fixed bed, which zones move at a constant speed and to an observer stationed at a fixed reference point appear to "rotate" relative to the flow path through the bed. While this process has been successfully carried out with more or less conventional apparatus, that is, apparatus comprising one or more serially connected elongated vessels having a number of longitudinally spaced fluid inlets and outlets connected to and served by a multiport or rotary plug or disc valve, a number of practical disadvantages are presented thereby. One is the high first cost of a suitable rotary distributing valve which is typically provided with from 10 to 50 ports and must simultaneously conduct up to 6 process streams of varying compositions, temperatures, and pressures. The internals of such a valve are exceedingly complex and must be machined to very close tolerances. Another drawback is the ever-present problem of cross-port leakage within the distributing valve, i.e., undesired intermixing of two or more process streams within the valve whereby a product stream is contaminated with feed or a portion of the sorbent bed is short-circuited. Furthermore, in order to prevent contamination of a product stream by that volume of feed contained in the conduits connecting the rotary valve with the contacting vessels, it is necessary to provide a flushing stream of desorbent or other readily separable material to sweep out successively, those conduits which previously conducted feed and are then about to conduct product. Difficulties such as these pointed up the need for an improved distributing valve and apparatus which is the substance of the present invention.

This invention has as its primary object the provision of a rotary distributing valve of improved and simplified design whereby a flowing stream may be introduced to or withdrawn from a fixed bed at a longitudinally translatable transfer point therein, which point is movable in accordance with the angular position of the valve shaft.

Another object of this invention is to provide a novel contacting vessel having a plurality of movable inlets and outlets spaced along the length thereof.

Still another object of this invention is to provide a multiple stream contacting apparatus which circumvents the problem of cross-port leakage or other inadvertent mixing of streams prior to entering or subsequent to leaving the contacting zone.

A further object of this invention is to provide a multiple-stream distributing valve which eliminates the use of a flushing stream.

These and other objects and advantages of the present invention will be apparent from the accompanying disclosure and drawings.

In one embodiment, this invention relates to a distributing valve comprising an elongated outer shell having a longitudinal wall which defines an elongated chamber having an interior of circular cross-section, a hollow elongated inner shell rotatably assembled within said chamber with the peripheral surface of said inner shell maintained in fluid-tight contact with the longitudinal wall of said outer shell, a shaft connected to and rotating one of said shells about its longitudinal axis, fluid conduit means communicating with the interior of said inner shell, a first elongated opening in the peripheral wall of said inner shell, a second elongated opening in the longitudinal wall of said outer shell, the axial projections of said openings on said longitudinal axis being at least partially co-extensive and the longitudinal edges of one opening being non-parallel with the longitudinal edges of the other opening and all of said edges being non-perpendicular to said longitudinal axis whereby said openings overlap at only one point over a portion of the angular displacement of one shell relative to the other to form a longitudinally translatable port of restricted cross-section connecting the interior of said inner shell with the exterior of said outer shell, the longitudinal position of said port being variable in accordance with the angular position of said shaft.

In another of its embodiments this invention concerns an apparatus for contacting a fluid with a fixed elongated bed of particulate contact material wherein a plurality of fluid streams are introduced to and withdrawn from said bed at spaced intervals along the length thereof and the points of fluid inlet and withdrawal are simultaneously advanced relative to the length of the bed, which apparatus comprises an enclosed vessel having an elongated side wall, a plurality of transversely spaced elongated distributing valves extending from the exterior of said vessel through an end thereof and disposed generally parallel to said side wall, each of said valves comprising in combination an elongated stator member having a longitudinal wall which defines an enclosed elongated chamber having an interior of circular cross-section, a hollow elongated rotor member rotatably assembled within said chamber with the peripheral surface of said rotor maintained in a fluid-tight contact with the longitudinal wall of said chamber, a shaft extending through an end of said chamber external to said vessel and connected to and rotating said rotor about its longitudinal axis, fluid conduit means extending through said stator and communicating with the interior of said rotor, a first elongated opening in the peripheral wall of the rotor, a second elongated opening in the longitudinal wall of the stator, at least one of said elongated openings forming a helical slot extending around substantially the entire perimeter of said peripheral surface, the axial projections of said openings on said longitudinal axis being substantially co-extensive and the longitudinal edges of one opening being non-parallel to the longitudinal edges of the other opening and all of said edges being non-perpendicular to said longitudinal axis whereby said openings overlap at only one point over a major portion of the angular displacement of said rotor relative to said stator to form a longitudinally translatable port of restricted cross-section connecting the interior of said rotor with the exterior of said stator, the longitudinal position of said port being variable in accordance with the angular position of the rotor, said second openings of all of said valves being entirely within said vessel and substantially co-extensive and the respective ports of said valves being longitudinally spaced with respect to each other, the relative displacement between said ports being maintained substantially constant.

The structure and arrangement of the instant apparatus may best be described with reference to the accompanying drawings which are presented as illustrative of the best modes of practicing the invention but are not intended to be limiting upon the broad scope thereof. It will be appreciated that various refinements and modifications may be made to the disclosed apparatus without departing from the spirit and scope of the present invention.

Figure 1:
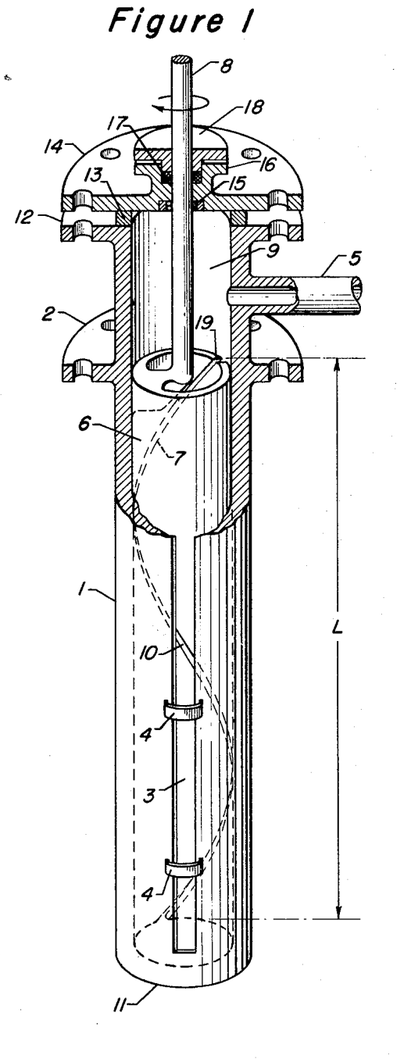
FIGURES 1 and 2 of the drawings are partial sectional elevation views of two embodiments of the distributing valve.

Referring now to FIGURE 1, the valve of this embodiment comprises an outer elongated shell or tube 1 which serves as the valve stator. At the upper portion of shell 1 is attached, as by welding, a support or flange member 2 by which the valve is sealably secured to a suitable vessel inlet or nozzle (not shown). The terms "upper" and "lower," etc. are used here purely for descriptive convenience, it being understood that the valve may be oriented in any position during the operation thereof. An elongated opening or slot 3 is cut through the wall of shell 1 and extends substantially parallel to the longitudinal axis of the shell, beginning immediately below flange 2 and terminating above the sealed lower end 11 of shell 1. A number of longitudinally spaced transverse support members or struts 4 are attached to the exterior of stator 1 across slot 3 to increase the rigidity of the stator; supports 4 are preferably bowed outwardly so as not to restrict appreciably the free area of slot 3. A fluid conduit 5 extends through the wall of stator 1 above flange 2 and communicates with the hollow interior 9 thereof.

A hollow inner shell or rotor 6 is rotatably assembled within stator 1, the peripheral surface thereof being maintained in a fluid-tight contact with the longitudinal wall of the stator, as described below. An elongated helical opening or slot 7 is cut through the wall of the rotor and extends the full length thereof, curving through an angle of about 360°. Slot 7 is thus substantially coextensive with slot 3 in stator 1 within the limits defined by length L. By virtue of slot 7, which is purposely unreinforced, rotor 6 in effect forms a helical spring of one revolution which is capable of radial elastic deformation. In the construction of the valve, motor 6 is fashioned to a slightly larger diameter than it will be held to when installed and is elastic enough to be sprung into place in the stator when inserted therein; upon assembly, the rotor tends to expand outwardly against the inner surface of stator 1, thereby assuring a tight fit therewith. Shaft 8 is connected to the upper interior surface of rotor 6, the point of connection preferably being immediately adjacent, or just behind, the following edge 19 of slot 7; which of the two longitudinal edges of slot 7 is the following edge is, of course, determined by the direction of rotation of the rotor (clockwise in FIGURE 1). When torque is applied to shaft 8, the torsional stress induced in rotor 6 tends to decrease its diameter so that the rotor does not bind upon the inner surface of stator 1 but yet is not so compressed as to lose contact therewith.

The intersection of slots 3 and 7 forms a diamond-shaped opening or port 10 connecting the interior of rotor 6 with the exterior of stator 1. The uppermost end of stator 1 is provided with a second flange member 12, gasket 13, and top head or closure member 14 which together seal off the upper interior 9 of stator 1. Conduit 5 thus communicates with space 9 and thence with the interior of rotor 6 through the upper open end thereof; the lower end of rotor 6 is also open to assure adequate elasticity of the rotor. Closure member 14 is provided with shaft bearings 13 and a conventional shaft sealing means for shaft 8 such as packing gland 16, packing 17, and compression head 18. Shaft 8 may be continuously or intermittently driven by any suitable means such as a geared-down electric motor, hydraulic or pneumatic pistons operating through a ratchet-and-pawl drive, and the like.

In the simplest and preferred construction of the valve, stator 1 and rotor 2 are formed from clindrical tubing or conduit. However, since it is essential only that the valve bearing surface comprising the inner surface of the stator and the outer surface of the rotor be circular to permit rotation, the respective opposite surfaces, i.e., the exterior of the stator and the interior of the rotor may be square, polygonal, or any convenient shape. Where desired, the bearing surface may be conical, venturi-shaped, or in fact may comprise any surface of revolution.

When the valve is placed in service, that portion thereof below flange 2 is inserted into a vessel containing the contact material. Conduit 5 may constitute a fluid inlet, in which case fluid enters conduit 5, flows downwardly through the interior of rotor 6 and out through port 10, or a fluid outlet in which case the direction of fluid flow is obviously reversed. In operation, with shaft 8 rotating clockwise as indicated in FIGURE 1, port 10 advances downwardly over the entire length L of the valve as a function of the angular position of the rotor relative to the stator. When port 10 reaches the lowermost portion of slot 7, continued rotation of the rotor causes the port to close off, in effect to disappear, while simultaneously port 10 is reformed in its uppermost position from which it again moves downwardly. In one embodiment, helical slot 7 subtends a circumferential or base angle of about 360°, i.e., forms a helix of one revolution so that over a minor portion (transition period) of the valve rotation two ports 10 exist at opposite ends of length L, the lower one closing off and the upper one opening up. Thus, complete closure of the valve never occurs during the transition period, which feature is advantageous in those applications where continuity of fluid flow must be preserved. In another embodiment, helical slot 7 forms a helix of less than one revolution so that slots 3 and 7 overlap at only one point to form a single port 10, complete closure of the valve being obtained during a portion of the valve rotation. In FIGURE 1 helical slot 7 should not subtend base angle substantially in excess of 360° over the length L along which slots 3 and 7 are co-extensive; otherwise the resulting multiple points of overlap of the two slots would create a plurality of ports spaced along length L during periods of the valve rotation other than during the transition period.

In a preferred embodiment of the invention, helical slot 7 has a constant pitch angle so that the longitudinal position of opening 10 is a linear function of shaft angular position, although a non-linear helix may be employed when desired. In this as well as in succeeding embodiments, the pitch angle of a slot is defined as $\tan^{-1}(C/L)$, where C is the length of the projection of the slot on a cutting plane perpendicular to the longitudinal axis of the valve and L is the effective length of the slot and is equal to the length of its projection on said longitudinal axis.

Figure 2:
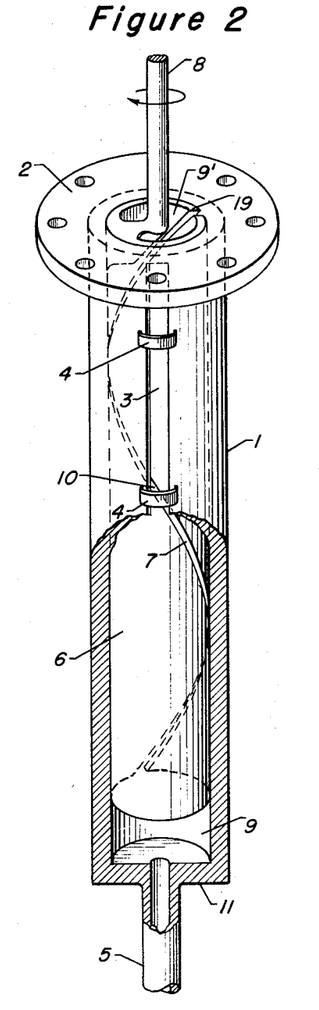

Referring next to FIGURE 2, there is illustrated a partial sectional elevation view of another embodiment of the valve wherein conduit 5 extends through the lower end wall 11 of stator 1. The lower open end of rotor 6 provides free communication between the interior of rotor 6 and conduit 5. Supporting flange 2 is attached to the uppermost portion of stator 1, and a matching head assembly similar to components 13 to 18 inclusive of FIGURE 1 (not shown in FIGURE 2) is fitted in pressure-tight contact with flange 2, sealing shaft 8 and rotor interior 9′, and the whole assembly may advantageously be bolted to a suitable vessel nozzle by means of common through-bolts. Conduit 5 extends on through an opposite end wall of the vessel, not shown here but illustrated in a following embodiment.

Figure 3:
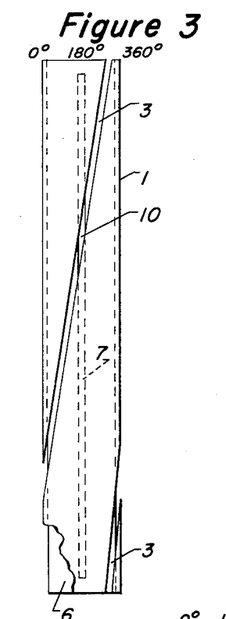
FIGURES 3, 4, and 5 are planar developments of the valve surfaces showing various arrangements of the valve ports.
Figure 4:
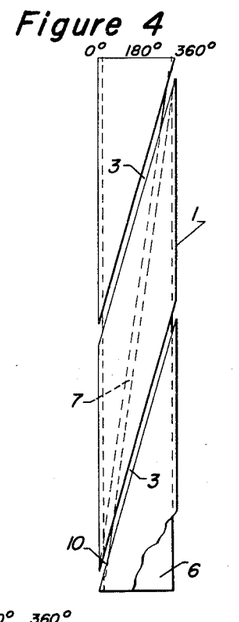
Figure 5:
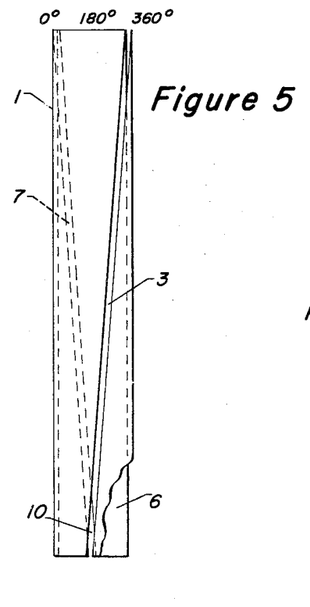

FIGURES 3, 4 and 5 are planar developments of the valve rotor and stator illustrating alternative arrangements of slots 3 and 7 which also come within the scope of the invention. In each drawing the surfaces are rolled flat with the exterior of stator 1 appearing on top. In FIGURE 3, outer slot 3 is helical while inner slot 7 is straight and parallel to the longitudinal axis of the valve. In this embodiment, rotor 6 is made rigid by transverse support members (not shown) similar to struts 4 used on the stator in the embodiments of FIGURES 1 and 2, while stator 1 is made elastic by helical slot 3. The stator is manufactured to a slightly smaller diameter than it will have when the rotor is inserted therein, and is sprung open slightly to admit the rotor on assembling the valve. Since outer slot 3 is helical, port 10 will move circumferentially as well as longitudinally in relation to the fixed particle bed which surrounds the valve, which feature is advantageous in some instances in promoting more efficient contact between fluid and solid. As in FIGURES 1 and 2, the embodiment of FIGURE 3 provides that the helical slot subtends a base angle of about 360°, that is, its projection on a cutting plane perpendicular to the longitudinal axis of the valve will define substantially a full circle, while the linear or rectangular slot subtends an arc of about 0°, neglecting its rather small but finite width.

In FIGURE 4, outer slot 3 and inner slot 7 are both helical but have unequal pitch angles; outer slot 3 has a greater pitch angle than inner slot 7 and subtends a base angle greater than 360°, the difference in the base angles subtended by the two slots being approximately 360°. Obviously, outer slot 3 may be made to have the smaller pitch angle, when desired. In this embodiment either the stator or the rotor may be rigid, the other being elastic.

In FIGURE 5, outer slot 3 and inner slot 7 are both helical and have equal but opposed pitch angles; each of the slots subtends a base angle of only 180°, but since they are oppositely directed the effective difference in subtended base angles is again about 360°. This modification is advantageous in that both stator and rotor may remain elastic and reinforcing members such as struts 4 of FIGURES 1 and 2 may be omitted; the stator is formed to spring inwardly and the rotor to spring outwardly, the combined spring action thus effecting a fluid-tight seal at the bearing surface of the valve.

It is clear from the foregoing embodiments that, where complete closure of the valve is to be avoided for any angular position thereof, and only one port is to exist except during the transition portion of the valve rotation, the essential relationship between the inner and outer slots is that the difference in the base angles subtended thereby must be approximately 360°.

It is preferred that the longitudinal edges of slot 3, and also of slot 7, be substantially parallel so that port 10 is of constant cross-section regardless of the relative angular displacement between stator 1 and rotor 6. The longitudinal edges of a slot are defined as the two edges of greater dimension, as distinguished from the two edges constituting the width thereof in the case of a reinforced slot. It is also within the scope of the invention, however, to provide either or both of the slots with non-parallel or converging longitudinal edges so that the cross-sectional area of port 10 is variable in accordance with shaft position; this feature is desirable in those cases where an increasing pressure drop through a fixed bed of contact material of increasing length is to be balanced by a decreasing pressure drop through port 10 whereby the sum of the two pressure drops is maintained constant. Although slots 3 and 7 are shown as substantially coextensive in order to utilize the full length of the valve, it is also possible to make them only partially co-extensive, for example, slot 3 could extend some distance above the upper end of slot 7, but this portion of slot 3 could not, of course, come into play in forming port 10. An important feature of the invention is that neither slot 3 nor slot 7 nor any portion of the longitudinal edges of slots 3 and 7 be perpendicular to the longitudinal axis of the valve (resulting in a slot or portion thereof which is horizontal in FIGURE 3, for example), since port 10 would then be incapable of longitudinal displacement over that portion of the slot which was horizontal. A further modification of the valve is to substitute a row of holes, either linearly or helically arranged, for outer slot 3. In this case the motion of the stream transfer point may be continuous or stepwise depending on the spacing of the holes.

Figure 6:
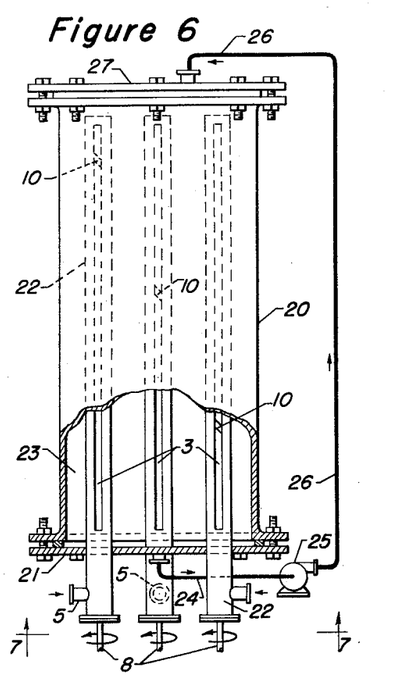
FIGURES 6 and 7 are partial sectional elevation and plan views respectively of one embodiment of the contacting apparatus employing the valve of this invention.
Figure 7:
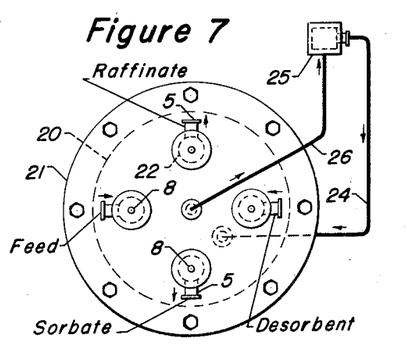

FIGURE 6 is a partial sectional elevation view of a contacting vessel employing a plurality of the valves of FIGURE 1, and FIGURE 7 is a plan view of the apparatus taken along line 7—7 of FIGURE 6. The apparatus illustrated is specifically designed for carrying out a 4-zone selective sorption process using molecular sieves for the liquid phase separation of a mixture of iso and normal paraffins. Briefly, the process comprises introducing the feed into one point of an elongated contacting zone through which liquid is circulated, withdrawing an iso-paraffin-rich stream downstream from the feed point, adding a liquid desorbent at a point downstream from the iso-draw point, withdrawing a normal-paraffin-rich stream downstream from the desorbent addition point, and simultaneously advancing all of the inlet and outlet points in a downstream direction. That portion of the molecular sieve bed between the feed and iso-draw points is the "sorption" zone, between the iso-draw and desorbent adition points the "primary rectification" zone, between the desorbent addition and normal-draw points the "desorption" zone, and between the normal-draw and feed points, the "secondary rectification" zone. An elongated enclosed vessel 20 is provided with a removable bottom head 21 through which extend four distributing valves 22, each being similar in structure to the valve of FIGURE 1. Valves 22 are suitable affixed to head 21 to form a pressure-tight seal therewith and extend upwardly substantially the full length of vessel 20. The space 23 surrounding the valves is filled with a bed of molecular sieves. The molecular sieves are conveneintly loaded into the vessel by removing top head 27. Conduits 5 conduct (1) feed to the bed, (2) raffinate (isoparaffin-rich material) from the bed, (3) desorbent, for example n-butane to the bed, and (4) sorbate (normal-paraffin-rich material) from the bed, in that order. External means for recirculating liquid from the bottom of vessel 20 to the top thereof are provided by way of line 24, pump 25, and line 26. Slots 3 of valves 22 may be shielded by a suitable screen to prevent entrance of the sieves therein. Ports 10 are staggered at intervals along the length of vessel 20, and the rotary drive means for rotating shafts 8 are mechanically or electrically synchronized so that the relative longitudinal displacement of ports 10 is kept substantially constant; accordingly, the volume of solid sorbent disposed between the ports is also constant regardless of the instantaneous location of the ports. As shafts 8 rotate, the sorption, primary rectification, desorption and secondary rectification zones, which simultaneously exist in the single bed, are continuously advanced therethrough, thus achieving a truly continuous separation by means of a fixed bed of sorbent.

Figure 8:
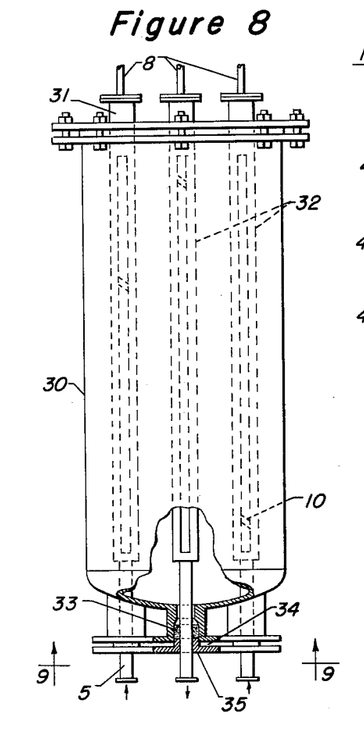
FIGURES 8 and 9 are partial sectional elevation and plan views respectively of another embodiment of the contacting apparatus.
Figure 9:
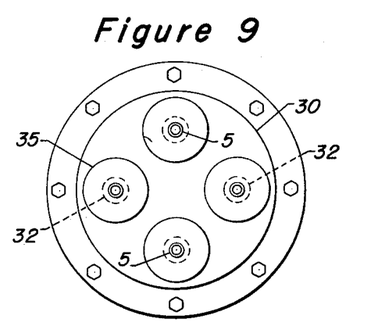

FIGURE 8 illustrates an alternative form of contacting apparatus employing a plurality of the distributing valves of FIGURE 2, and FIGURE 9 is a plan view of the apparatus taken along the line 9—9 of FIGURE 8. An elongated enclosed vessel 30 is provided with four nozzles 31 in the top head thereof, each of nozzles 31 supporting a valve 32 similar to that of FIGURE 2, previously described. Valves 32 extend substantially the full length of vessel 30. Conduits 5 extend from the bottoms of valves 32 through the lower end wall of vessel 30 and through packing glands 34, each containing packing 33 and sealed by compression head 35; the function of the packing gland is to permit longitudinal expansion of the valve resulting from thermal stresses. External fluid recirculating means are not shown but it is understood that such means will be employed. The operation of this embodiment of the invention is identical to that of FIGURE 6.

Figure 10:
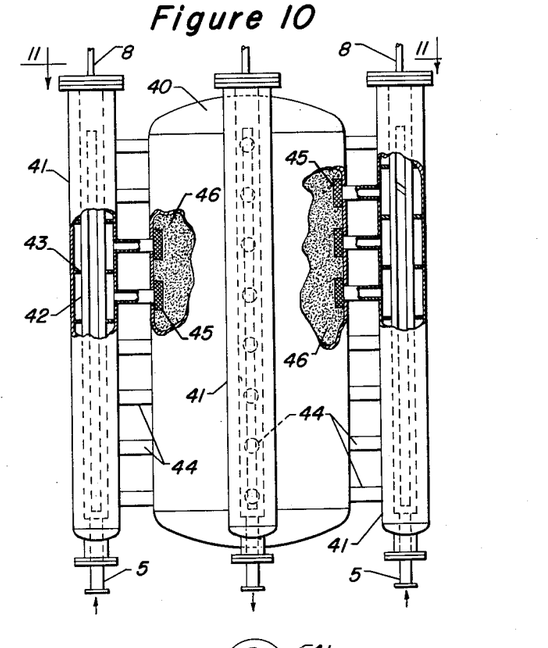
FIGURES 10 and 11 are partial sectional elevation and plan views respectively of still another embodiment of the contacting apparatus.
Figure 11:
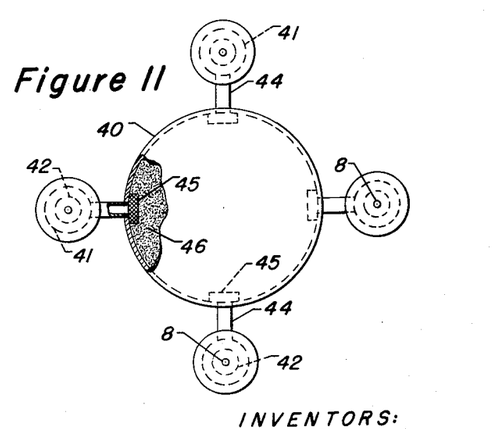

FIGURE 10 illustrates still another embodiment of the invention wherein the distributing valves are disposed in separate chambers apart from the main contacting vessel, and FIGURE 11 is a plan view of the apparatus taken along the line 11—11 of FIGURE 2. Elongated vessel 40 is filled with molecular sieves 46. For elongated valve housings 40 are symmetrically placed around vessel 40, and each of housings 41 contains a distributing valve 42 similar to that of FIGURE 2, previously described; alternatively, the distributing valves of FIGURE 1 may instead be employed. A plurality of longitudinally spaced imperforate baffles 43 are connected to the interior of housing 41 and to the exterior of valve 42 thereby dividing the interior of the housing into a series of sealed compartments. A plurality of conduits 44 connects each of the compartments to the interior of vessel 40, the points of connection of conduits 44 being substantially equally spaced along the length of vessel 40, and each of said points of connection being shielded by a screen member 45 to prevent entrance of the finely divided solid sorbent into the respective conduit. Again, external fluid recirculating means for circulating fluid from one end of vessel 40 to the other are omitted for the sake of clarity, it being understood that such means will be employed. The operation of this embodiment of the invention is similar to that of FIGURES 6 and 8 except that the translation of the stream inlets and outlets relative to bed 46 is incremental, rather than continuous; however, by providing a suiably large number of compartments and conduits 44, the effect is usually indistinguishable from a strictly continuous movement of stream inlets and outlets.

Figure 12A:
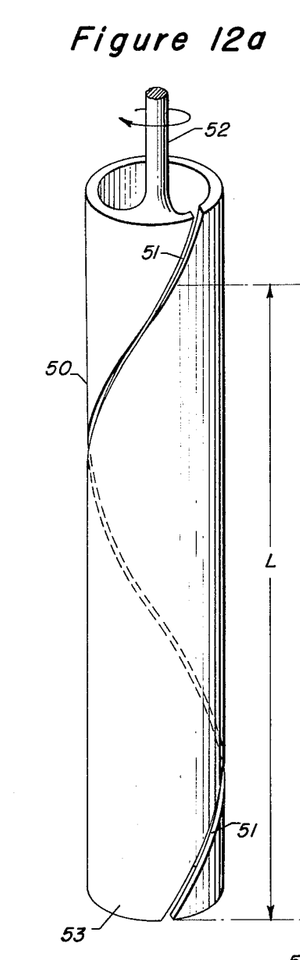
FIGURES 12a and 12b are elevation views of the rotor and stator, respectively of still another modification of the valve.
Figure 12B:
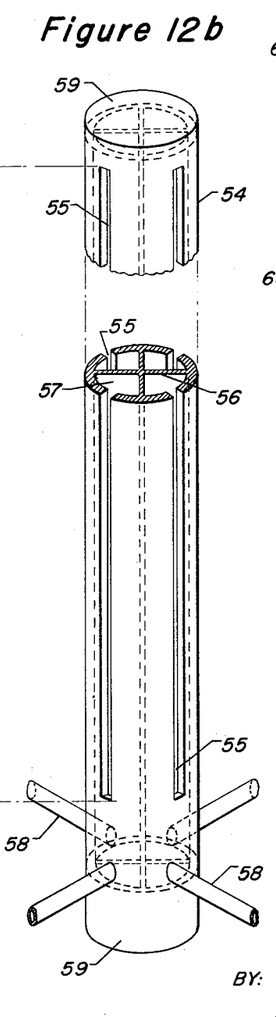

A particularly useful embodiment of the distributing valve results when the positions of stator and rotor are interchanged, i.e., the outer shell serving as the rotor and the inner shell as the stator. This design is illustrated in FIGURES 12a and 12b of the drawings wherein the rotor is shown in FIGURE 12a and the stator in FIGURE 12b. An open-ended rotor member 50 is provided with a helical slot 51 extending the full length thereof and curving through a base angle of at least 360°. Shaft 52 is connected to one end of rotor 50 immediately adjacent the leading edge of slot 51 so that, with the indicated clockwise rotation of shaft 52, rotor 50 will elastically increase slightly in diameter and will not bind upon the inner stator member during rotation. The other end 53 of the rotor is left fully open to admit the stator. Stator 54 is a hollow elongated cylinder whose interior is sealed off by upper and lower end walls 59. A longitudinal partitioning member 56, having an X-shaped cross-section, is provided within the interior of stator 54 and extends the full length thereof, being connected to end walls 59 as well as to the longitudinal wall, thereby dividing the interior of stator 54 into four elongated sealed compartments 57. Four substantially rectangular longitudinal slots 55 are cut through the peripheral wall of the stator and are circumferentially spaced about 90° apart so that each slot 55 communicates with one of compartments 57. Slots 55 are disposed parallel to the longitudinal axis of the stator, extend a substantial distance therealong, and are co-extensive over length L. Four conduits 58 extend through an end portion of stator 54, each communicating with one of compartments 57. Upon insertion of stator 54 into rotor 50, that portion of helical slot 51 which is co-extensive with longitudinal slots 55 curves through an angle of approximately 360° so that helical slot 51 overlaps each of slots 55 at only one point along each to form four longitudinally and circumferentially spaced ports of restricted cross-section, each port continually connecting one of compartments 57 with the exterior of rotor 50. As shaft 52 is rotated, all of the ports advance simultaneously relative to length L. By this means, a single distributing valve can accomplish the simultaneous distribution of a plurality of separate fluid streams. It is preferred that helical slot 51 have a constant pitch angle so that the relative longitudinal displacement of the ports is constant regardless of the angular position of the rotor relative to the stator. If the circumferential spacing of longitudinal slots 55 is uniform, then the longitudinal spacing of the ports will be equal; if desired, slots 55 may be asymmetrically spaced to provide varying distances between ports. It is, of course, obvious that any number of compartments, longitudinal slots 55, and conduits 58 may be employed depending upon the number of fluid streams being distributed.

Figure 13:
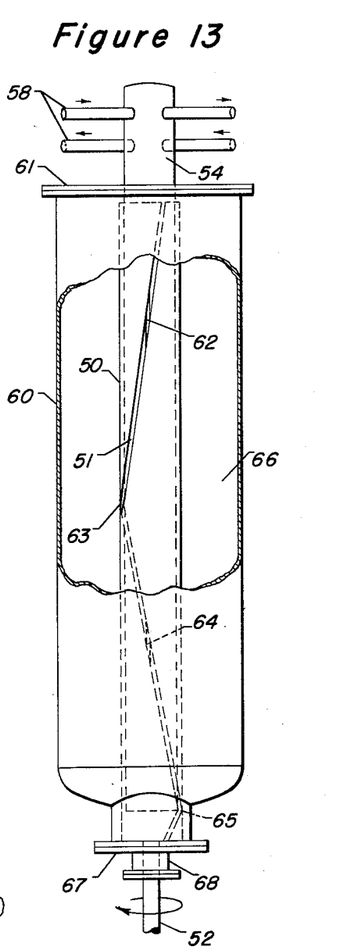
FIGURE 13 illustrates contacting apparatus using the valve of FIGURES 12a and 12b.

FIGURE 13 illustrates a suitable fluid-solid contacting apparatus using the valve of FIGURE 12a and 12b. An elongated vessel 60 is provided with a removable top head 61 through which extends stator 54, which is sealably attached thereto, as by welding. The opposite end of the vessel is provided with a removable bottom flange 67 through which rotor 50 is inserted. Shaft 52 extends through flange 67 and shaft-sealing means 68. When desired, flange 67 may be fitted with bearing means to provide additional relatively frictionless support for rotor 50. The apparatus is readied for operation first by inserting rotor 50 and securing bottom head 67, next adding the contact material through the open upper end of the vessel to fill space 66, and then inserting stator 54 into rotor 50 and securing top head 61. A suitable screen (not shown) may be fitted about the exterior of rotor 50 to prevent finely divided contact material from entering the ports. The overlapping of helical slot 51 with the longitudinal slots forms four restricted ports 62, 63, 64, 65 uniformly spaced along the length of vessel 60. With the clockwise rotation of shaft 52 and the indicated pitch angle of helical slot 51, the four ports simultaneously advance upwardly. By reversal of either, the direction of port movement may be reversed. The application and operation of this embodiment with respect to hydrocarbon separation by molecular sieves is identical to that of the foregoing embodiments except that only a single distributing valve is required.

Another embodiment of the invention employs a plurality of serially connected vessels such as vessel 20 of FIGURE 6 instead of a single vessel, each vessel being provided with the requisite number of distributing valves 22. In this case only one process stream at a time is introduced to or withdrawn from a single vessel, those distributing valves which are not presently conducting a fluid being blanked off by an automatic gate valve, and all of the gate valves being sequentially controlled by a master programming controller. Two or more circulating pumps or compressors may be provided between vessels to minimize pressure differential between beds. This arrangement is advantageous in that it guarantees non-leakage between feed and product streams, and is particularly desirable when physical isolation of the various equilibrium zones is required for reasons of safety, for example, in a catalytic reforming process wherein a reforming catalyst is first subjected to a hydrogen atmosphere and is thereafter regenerated with air or oxygen.

Although the apparatus of FIGURES 6 to 13 has been discussed with reference to, and is specifically designed for, a selective sorption process for the separation of isomeric hydrocarbons, it is contemplated that with minor modifications the present invention may readily be adapted to effect a wide variety of fluid-solid contacting operations such as the hydrocarbon conversion processes hereinabove discussed. Any number of distributing valves may be employed with a single bed of contact material, according to the number of separate process streams being handled, or the single valve of FIGURE 13 may be used, as desired. The valve ports may or may not be equally spaced with reference to the bed length, depending upon the required volume of contact material associated with each equilibrium zone. For application to naphtha reforming, hydrocracking, coking, hydrogen production, etc., these modifications may be made to the contacting apparatus as will be apparent to those skilled in the art.

We claim as our invention:

1. A distributing valve which comprises an elongated stator member having a longitudinal wall which defines an enclosed elongated chamber having an interior of circular cross-section, a hollow elongated rotor member of spring-like material rotatably assembled within said chamber with the peripheral surface of said rotor maintained in fluid-tight contact with the longitudinal wall of said chamber, the external diameter of the rotor when disassembled from the stator being greater than the inner diameter of the stator and the rotor in assembly with the stator being under torsional stress and exerting an outward radial force on the wall of the stator, a shaft connected to and rotating said rotor about its longitudinal axis, fluid conduit means extending through said stator and communicating with the interior of said rotor, a first elongated opening in the peripheral wall of the rotor extending the entire length of the rotor and forming a helical slot therein, a second elongated opening in the longitudinal wall of the stator, the axial projections of said openings on said longitudinal axis being at least partially co-extensive and the longitudinal edges of one opening being non-parallel with the longitudinal edges of the other opening and all of said edges being non-perpendicular to said longitudinal axis whereby said openings overlap at only one point over a portion of the angular displacement of said rotor relative to said stator to form a longitudinally translatable port of restricted cross-section connecting the interior of said rotor with the exterior of said stator, the longitudinal position of said port being variable in accordance with the angular position of the rotor.

2. A distributing valve which comprises an elongated stator member having a longitudinal wall which defines an enclosed elongated chamber having an interior of circular cross-section, a hollow elongated rotor member of spring-like material rotatably assembled within said chamber with the peripheral surface of said rotor maintained in fluid-tight contact with the longitudinal wall of said chamber, the external diameter of the rotor when disassembled from the stator being greater than the inner diameter of the stator and the rotor in assembly with the stator being under torsional stress and exerting an outward radial force on the wall of the stator, a shaft extending through said stator and connected to and rotating said rotor about its longitudinal axis, fluid conduit means extending through said stator and communicating with the interior of said rotor, a first elongated opening in the peripheral wall of the rotor extending the entire length of the rotor and forming a helical slot therein, a second elongated opening in the longitudinal wall of the stator, the axial projections of said openings on said longitudinal axis being substantially co-extensive and the longitudinal edges of one opening being non-parallel with the longitudinal edges of the other opening and all of said edges being non-perpendicular to said longitudinal axis whereby said openings overlap at only one point over a major portion of the angular displacement of said rotor relative to said stator to form a longitudinally translatable port of restricted cross-section connecting the interior of said rotor with the exterior of said stator, the longitudinal position of said port being variable in accordance with the angular position of the rotor.

3. The valve of claim 2 furuther characterized in that said helical slot extends around substantially the entire perimeter of said peripheral surface.

4. The valve of claim 2 further characterized in that said second elongated opening forms a slot whose longitudinal edges are parallel to said longitudinal axis.

5. A distributing valve which comprises an elongated stator member having a longitudinal wall which defines an enclosed elongated chamber having an interior of circular cross-section, a hollow elongated rotor member of spring-like material and having one end at least partially open, said rotor member being rotatably assembled within said chamber with the peripheral surface of said rotor maintained in fluid-tight contact with the longitudinal wall of said chamber the external diameter of the rotor when disassembled from the stator being greater than the inner diameter of the stator and the rotor in assembly with the stator being under torsional stress and exerting an outward radial force on the wall of the stator, a shaft extending through said stator and connected to and rotating said rotor about its longitudinal axis, fluid conduit means extending through said longitudinal wall and communicating with the interior of said rotor through said open end thereof, a first elongated opening in the peripheral wall of the rotor extending the entire length of the rotor and forming a helical slot therein, a second elongated opening in the longitudinal wall of the stator, the axial projections of said openings on said longitudinal axis being substantially co-extensive and the longitudinal edges of one opening being non-parallel with the longitudinal edges of the other opening and all of said edges being non-perpendicular to said longitudinal axis whereby said openings overlap at only one point over a major portion of the angular displacement of said rotor relative to said stator to form a longitudinally translatable port of restricted cross-section connecting the interior of said rotor with the exterior of said stator, the longitudinal position of said port being variable in accordance with the angular position of the rotor.

6. A distributing valve which comprises an elongated stator member having a longitudinal wall and a pair of end walls which define an enclosed elongated chamber having an interior of circular cross-section, a hollow elongated rotor member of spring-like material and having one end at least partially open, said rotor member being rotatably assembled within said chamber and the peripheral surface of said rotor maintained in fluid-tight contact with the longitudinal wall of said chamber, the external diameter of the rotor when disassembled from the stator being greater than the inner diameter of the stator and the rotor in assembly with the stator being under torsional stress and exerting an outward radial force on the wall of the stator, a shaft extending through one of said end walls and connected to and rotating said rotor about its longitudinal axis, fluid conduit means extending through the other of said end walls and communicating with the interior of said rotor through said open end thereof, a first elongated opening in the peripheral wall of the rotor extending the entire length of the rotor and forming a helical slot therein, a second elongated opening in the longitudinal wall of the stator, the axial projections of said openings on said longitudinal axis being substantially co-extensive and the longitudinal edges of one opening being non-parallel with the longitudinal edges of the other opening and all of said edges being non-perpendicular to said longitudinal axis whereby said openings overlap at only one point over a major portion of the angular displacement of said rotor relative to said stator to form a longitudinally translatable port of restricted cross-section connecting the interior of said rotor with the exterior of said stator, the longitudinal position of said port being variable in accordance with the angular position of the rotor.

7. A distributing valve which comprises an elongated outer shell having a longitudinal wall which defines an elongated chamber having an interior of circular cross-section, a hollow elongated inner shell within said chamber with the peripheral surface of said inner shell maintained in fluid-tight contact with the longitudinal wall of said outer shell, said inner and outer shells having contact areas forming bearing surfaces, one of said shells being mounted for rotation relative to the other and being constructed of spring-like material, the diameters of the bearing surfaces of said inner and outer shells being unequal when said shells are disassembled and the rotatably mounted shell in assembly with the other shell being under torsional stress and exerting a radial force on the bearing surface of said other shell, a shaft connected to and rotating the rotatably mounted shell about its longitudinal axis relative to the other shell, fluid conduit means communicating with the interior of said inner shell, a first elongated opening in the wall of said rotatably mounted shell extending the entire length thereof and forming a helical slot therein, a second elongated opening in the wall of said other shell, the axial projections of said openings on said longitudinal axis being at least partially co-extensive and the longitudinal edges of one opening being non-parallel with the longitudinal edges of the other opening and all of said edges being non-perpendicular to said longitudinal axis whereby said openings overlap at only one point over a portion of the angular displacement of one shell relative to the other to form a longitudinally translatable port of restricted cross-section connecting the interior of said inner shell with the exterior of said outer shell, the longitudinal position of said port being variable in accordance with the angular position of said shaft.

8. A distributing valve comprising in combination a hollow elongated rotor member of spring-like material and having a longitudinal wall which defines an interior of circular cross-section, a hollow elongated stator member within said rotor with the peripheral surface of said stator maintained in fluid-tight contact with the longitudinal wall of said rotor, the inner diameter of the rotor when disassembled from the stator being less than the external diameter of the stator and the rotor in assembly with the stator being under torsional stress and exerting an inward radial force on the wall of the stator, shaft means connected to and rotating said rotor about its longitudinal axis, fluid conduit means communicating with the interior of said stator, a first elongated opening in the longitudinal wall of the rotor extending the entire length of the rotor and forming a helical slot therein, a second elongated opening in the peripheral wall of the stator, the axial projections of said openings on said longitudinal axis being at least partially co-extensive and the longitudinal edges of one opening being non-parallel with the longitudinal edges of the other opening and all of said edges being non-perpendicular to said longitudinal axis whereby said openings overlap at only one point over a portion of the angular displacement of said rotor relative to said stator to form a longitudinally translatable port of restricted cross-section connecting the interior of said stator with the exterior of said rotor, the longitudinal position of said port being variable in accordance with the angular position of the rotor.

9. A distributing valve comprising in combination a hollow elongated rotor member of spring-like material and having a longitudinal wall which defines an interior of circular cross-section, a hollow elongated stator member having a sealed interior disposed within said rotor with the peripheral surface of said stator maintained in fluid-tight contact with the longitudinal wall of said rotor, the inner diameter of the rotor when disassembled from the stator being less than the external diameter of the stator and the rotor in assembly with the stator being under torsional stress and exerting an inward radial force on the wall of the stator, shaft means connected to and rotating said rotor about its longitudinal axis, longitudinal partitioning means within said stator dividing the hollow interior thereof into a plurality of sealed compartments, fluid conduit means separately communicating with each of said compartments, a plurality of circumferentially spaced elongated longitudinal slots in the peripheral wall of said stator extending parallel to said longitudinal axis, each of said longitudinal slots communicating with one of said compartments, a helical slot in the longitudinal wall of the rotor extending around substantially the entire perimeter thereof and extending the entire length of the rotor, the axial projections of the helical and longitudinal slots on said longitudinal axis being substantially co-extensive whereby the helical slot simultaneously overlaps each of said longitudinal slots at only one point over a major portion of the angular displacement of said rotor relative to said stator to form a plurality of longitudinally and circumferentially spaced ports of restricted cross-section each connecting one of said compartments with the exterior of said rotor, said ports being simultaneously and longitudinally translatable in accordance with the angular position of the rotor.

References Cited in the file of this patent

UNITED STATES PATENTS

| | | |
|---|---|---|
| 2,371,619 | Hartley | Mar. 20, 1945 |
| 2,511,477 | Mueller | June 13, 1950 |
| 2,517,339 | Offutt et al. | Aug. 1, 1950 |
| 2,558,376 | Opp et al. | June 26, 1951 |
| 2,566,071 | Schobert | Aug. 28, 1951 |
| 2,655,929 | Herold | Oct. 20, 1953 |